UNITED STATES PATENT OFFICE.

FREDERICK H. SNYDER, OF JERSEY CITY, NEW JERSEY, ASSIGNOR OF ONE-THIRD TO GEORGE W. RICHARDSON AND MARTIN LUSCOMB, BOTH OF BOSTON, MASSACHUSETTS.

COMPOUND FOR ROOFING AND PROTECTING METALS.

SPECIFICATION forming part of Letters Patent No. 357,104, dated February 1, 1887.

Application filed October 22, 1883. Renewed May 15, 1885. Serial No. 165,677. (No specimens.)

*To all whom it may concern:*

Be it known that I, FREDERICK H. SNYDER, a citizen of the United States, residing at Jersey City, in the county of Hudson and State of New Jersey, have invented certain new and useful Improvements in Compounds for Roofing and Protecting Metals, of which the following is a specification.

My invention relates to the use of what is commonly known as "gas-carbon"—that form of carbon found adherent to the interior of retorts used for the manufacture of illuminating-gas—for the manufacture of paint for various purposes.

In preparing this material I first pulverize the crude gas-carbon very finely. If a fine grade of paint is desired, or a quality possessing great refractory properties, I prefer to use gas-carbon that has been treated by a process described and shown in my application for Letters Patent of the United States allowed the 15th of June, 1883, Serial No. 95,045; but coarser grades that can be used for many purposes may be made by grinding or pulverizing the crude carbon as taken from the gas-retorts, without separating or purifying the same. In using gas-carbon it may be mixed with oil or other substances in the same manner as any of the ordinary substances used in compounding paints. The merits of a paint of which gas-carbon is the basis will readily occur to any one familiar with its characteristics and qualities. The material has so little chemical affinity for other substances that it cannot be easily affected when placed in contact with chemicals or liquids which often destroy other forms of paint. For this reason it is valuable for painting iron or metal surfaces, as the oxidatives of the metal will not injure it. For coating the bottoms of vessels it will be found valuable. Its refractory properties make it valuable for painting buildings or roofs that are liable to be exposed to fires, or for smoke-stacks and similar heated surfaces, where the action of the heat is apt to destroy the usual forms of paint. Its hardness makes it valuable to use in the place of black lead, lamp-black, &c., as it will readily mix with other paints.

Having thus described my invention, what I claim as new, and desire to secure by Letters Patent, is—

In the manufacture of compounds for roofing and protecting metals and other substances, a composition of which gas-carbon is a constituent element, substantially as described.

In testimony whereof I affix my signature in presence of two witnesses.

FREDERICK H. SNYDER.

Witnesses:
GEORGE W. JOHNES,
D. W. BLISS.